US007667723B2

(12) United States Patent
Cannon et al.

(10) Patent No.: US 7,667,723 B2
(45) Date of Patent: Feb. 23, 2010

(54) ANGULAR ADJUSTMENT OF MEMS TORSION OSCILLATOR SCANNER

(75) Inventors: Roger Steven Cannon, Nicholasville, KY (US); Daniel Eugene Pawley, Louisville, KY (US); Philip Edwin Riggs, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 297 days.

(21) Appl. No.: 11/279,580

(22) Filed: Apr. 13, 2006

(65) Prior Publication Data

US 2007/0242126 A1 Oct. 18, 2007

(51) Int. Cl.
*B41J 2/47* (2006.01)
*G02B 26/08* (2006.01)
*G02B 7/02* (2006.01)

(52) U.S. Cl. ....................... 347/225; 359/198; 359/206; 359/819

(58) Field of Classification Search ....................... None
See application file for complete search history.

(56) References Cited

U.S. PATENT DOCUMENTS 4,887,894 A * 12/1989 Gluzerman et al. ......... 359/875
5,546,186 A * 8/1996 Ohi ............................ 356/458
5,596,404 A * 1/1997 Beck et al. .................. 356/301
2003/0210323 A1* 11/2003 Turner ........................ 347/231
2005/0030653 A1* 2/2005 Holderer et al. ............. 359/872

OTHER PUBLICATIONS

Thorlabs Inc., 2002, Kinematic Platform Mount (Part No. KM200B).*

* cited by examiner

*Primary Examiner*—Matthew Luu
*Assistant Examiner*—Kendrick X Liu

(57) ABSTRACT

Apparatus for aligning a scanner assembly in a laser scanning unit for an image forming device. A MEMS torsion oscillator is attached to a spherical base that is received by a socket in a laser scanning unit. The pivotal center of the scanner coincides with the center of the spherical base such that the center of the scanner does not move as the scanner is aligned in the skew, process, and scan directions. In various embodiments, the aligned relationship of the spherical base to the socket is maintained by an adhesive, a through-bolt, or a plurality of spring-biased adjustment screws. The configuration and location of the adjustment screws is such that adjustment of the scanner assembly is accomplished without blocking the laser beam used for alignment.

21 Claims, 7 Drawing Sheets

ANGULAR ADJUSTMENT OF MEMS TORSION OSCILLATOR SCANNER

FIELD

The disclosure relates to adjusting a MEMS torsion oscillator scanner used in image forming devices such as a laser printer. In particular, the disclosure relates to apparatus and methods for adjusting the skew, process, and scan alignment of the torsion oscillator with respect to subsequent lens and mirrors.

BACKGROUND

In an image forming apparatus, such as a laser printer, a laser beam is swept, or scanned, across a photosensitive drum. The accurate and precise placement of the swept laser beam ensures that the resulting output from the image forming apparatus is an accurate representation of the desired image.

Manufacturing tolerances and assembly techniques have an impact on the accuracy with which the laser beam strikes the photosensitive drum. Each of the components that interact with the laser beam, including the laser, the scanner, and any lenses and mirrors, potentially affects the path of the laser beam. Accordingly, it is important to be able to align one or more of the components to ensure the precise and accurate placement of the laser beam.

The scanning element, because it reflects the laser beam and also redirects the laser beam within a scan path, is particularly susceptible to misalignment. The precise placement and positioning of the scanner in the laser scanning unit greatly aids in the accurate representation of the desired image.

SUMMARY

Apparatus for the angular alignment of a scanner within a laser scanning unit is disclosed. A MEMS torsion oscillator is mounted in a holder with a spherical base, forming a scanner assembly. The pivotal center of the MEMS scanner is positioned at the center of the sphere that defines the spherical base. The laser scanning unit housing includes a socket that receives the spherical base. The ball-and-socket configuration allows the scanner to be aligned without affecting the location of the center of the scanner. The skew, process, and scan alignment of the scanner are adjusted by rotating the spherical base within the socket.

In one embodiment, the socket has a spherical shape that receives the spherical base. The spherical base is rotated around three axes until the scanner is aligned in the skew, process, and scan directions. In one embodiment, the spherical base is fixed to the socket with an adhesive that is cured after alignment is reached. In another embodiment, the spherical base has a threaded portion protruding through an opening in the socket. A spherical washer and nut engages the threaded portion and, when tightened, sandwiches the socket between the spherical base and the spherical washer, thereby fixing the spherical base to the socket in an aligned position.

In another embodiment, the socket has a cavity into which a plurality of protrusions make contact with the spherical base. The spherical base is supported by the protrusions. Three adjustment screws engage the scanner assembly in such a manner as to cause the spherical base to rotate about the three axes for adjusting the scanner in the skew, process, and scan directions. Substantially diametrically opposite each of the three adjustment screws is a spring member applying a force to the spherical base opposite that of the respective adjustment screw. The adjustment screws are located away from the center of the spherical base and have a fine pitch, thereby allowing fine and precise adjustment in the skew, process, and scan directions. The configuration and location of the adjustment screws is such that the scanner assembly is adjustable without interfering with the light path used to perform the alignment.

BRIEF DESCRIPTION OF THE DRAWINGS

Further features and advantages of the disclosed embodiments may become apparent by reference to the detailed description when considered in conjunction with the figures, which are not to scale, wherein like reference numbers indicate like elements through the several views, and wherein.

DETAILED DESCRIPTION

Figure 1:
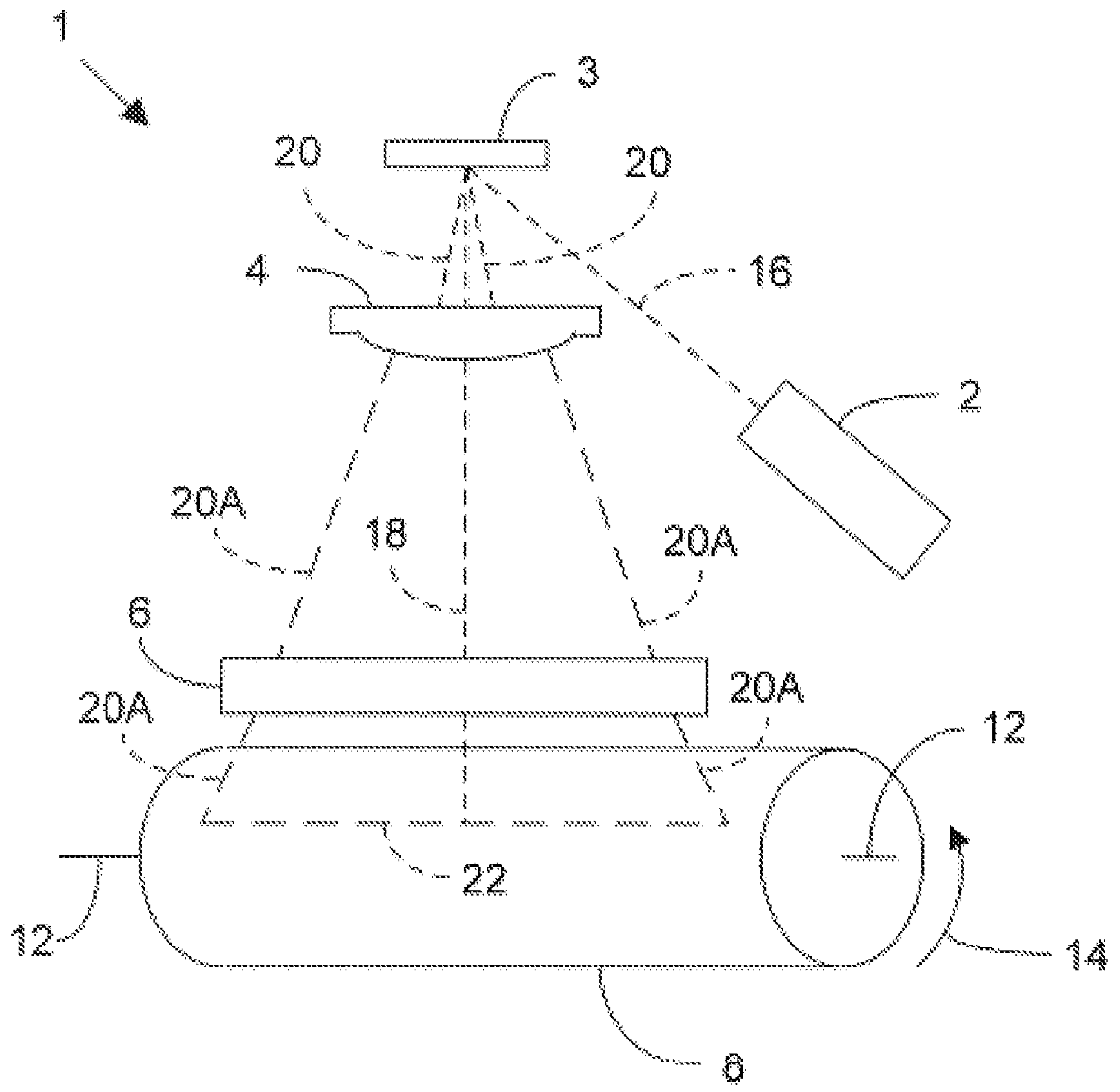
FIG. 1 is a simplified schematic of a laser scanning unit.

Apparatus for adjusting the alignment of a micro-electro-mechanical (MEMS) torsion oscillator scanner are disclosed. FIG. 1 illustrates a simplified schematic of a laser scanning unit 1. A laser 2 directs a stationary laser beam 16 toward the pivotal center of a scanner 3. The scanner 3 is a MEMS oscillator scanner that reflects the stationary laser beam 16 toward a lens 4. In various embodiments, the laser scanning unit 1 may include one or more redirection, or turn, mirrors 6 and one or more lenses 4, such as the illustrated f-theta lens 4. The scanner 3 reflects the stationary laser beam 16 such that the reflected laser beam 18 travels, or sweeps, between two boundaries 20. The reflected laser beam 18 passes through an f-theta lens 4, after which the reflected laser beam 18 is again reflected by a turn mirror 6 and strikes a photoconductive drum 8. The reflected laser beam 18 sweeps between two boundaries 20A between the f-theta lens 4 and the drum 8. On the photoconductive drum 8, the reflected laser beam 18 traces a scan path 22 along a scan direction between the intersection of the boundaries 20A with the surface of the drum 8. The drum 8 rotates about an axis 12 in a process direction 14.

For optimum performance of the laser scanning unit 1, the reflected laser beam 18 from a stationary scanner 3 should coincide with the optical center of the face of the lens 4. Further, the reflected laser beam 18 from the sweeping scanner 3 should follow a scan path 22 that meets the system requirements. Centering of the reflected laser beam 18 is achieved by adjusting the scanner 3 in the process 34 and scan 36 directions. Ensuring that the reflected laser beam 18 follows the scan path 22 is achieved by adjusting the scanner in the skew direction 32.

Figure 2A:
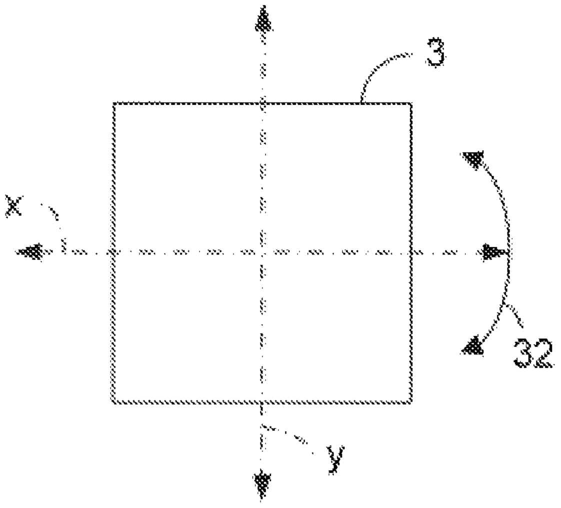
FIGS. 2A, 2B, and 2C are illustrations of the scanner showing the three axes of adjustment.
Figure 2B:
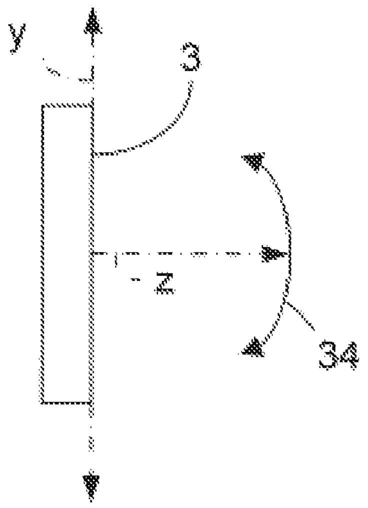
Figure 2C:
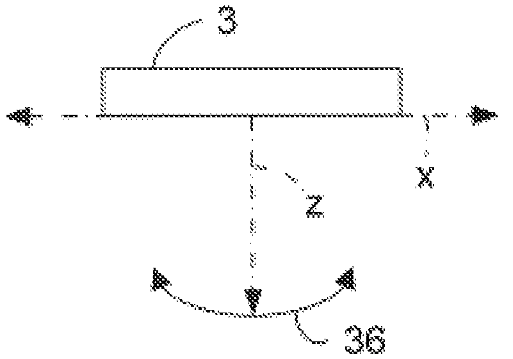

FIGS. 2A, 2B, and 2C illustrate the scanner 3 and the three axes about which the scanner 3 rotates for adjustment in the skew 32, process 34, and scan directions 36. FIG. 2A illustrates the face of the scanner 3 showing the x-axis and the y-axis. The z-axis, which is not visible in FIG. 2A, is perpendicular to the face of the scanner 3 and passes through the intersection of the x-axis and the y-axis. The x-axis, the y-axis, and the z-axis are mutually orthogonal, that is, each axis is perpendicular to the other two axes. The intersection of the x, y, and z-axes is the pivotal center, or the center of rotation, of the scanner 3. Ideally, rotation of the scanner 3 around any one of the x-, y-, and z-axes independently affects only one of the process, scan, and skew adjustments of the scanner 3.

It is noted that the reflected laser beam 18 does not coincide with the z-axis. Rather, the stationary laser beam 16 strikes the pivoting center of the scanner 3 and, when the scanner 3 is stationary, the reflected laser beam 18 is reflected away from the pivoting center of the scanner 3. With the scanner 3 stationary and the reflective surface of the scanner 3 aligned with the x and y-axes, the angle formed between the stationary laser beam 16 and the z-axis is equal to the angle formed between the reflected laser beam 18 and the z-axis.

Rotation of the scanner 3 about the z-axis, that is, rotating the plane defined by the x-axis and the y-axis around the intersection of the x- and y-axes in the skew direction 32, results in the reflected laser beam 18 following a scan path 22 that moves from an aligned scan path 22 to one that is tilted or skewed. The z-axis corresponds to the skew axis because rotation of the scanner 3 about the z-axis moves the reflected laser beam 18 in the skew direction 32. It is noted that, although FIG. 2A shows the x-axis undergoing angular rotation in the skew direction 32, the y-axis also undergoes an equal amount of angular rotation in the skew direction 32 as the x-axis.

FIG. 2B illustrates the result of rotation of the scanner 3 about the x-axis in the process direction 34. With the scanner 3 stationary, that is, not oscillating, rotation of the scanner 3 in the process direction 34 results in the reflected laser beam 18 moving above and/or below the optical center of the face of the lens 4, referenced to the orientation illustrated in FIG. 2A. That is, rotating the scanner 3 in the process direction 34 causes the reflected laser beam 18, as it traces the scan path 22, to shift, or translate, the scan path 22 along the circumference of the surface of the drum 8. The x-axis corresponds to the process axis because rotation of the scanner 3 about the x-axis moves the reflected laser beam 18 in the process direction 34.

FIG. 2C illustrates the result of rotation of the scanner 3 about the y-axis in the scan direction 36. With the scanner 3 stationary, that is, not oscillating, rotation of the scanner 3 in the scan direction 36 results in the center of the reflected laser beam 18 moving left and/or right of the optical center of the face of the lens 4. That is, rotating the scanner 3 in the scan direction 36 causes the reflected laser beam 18, as it traces the scan path 22, to shift, or translate, the scan path 22 along the width of the surface of the drum 8. The y-axis corresponds to the scan axis because rotation of the scanner 3 about the y-axis moves the reflected laser beam 18 in the scan direction 36.

Figure 3:
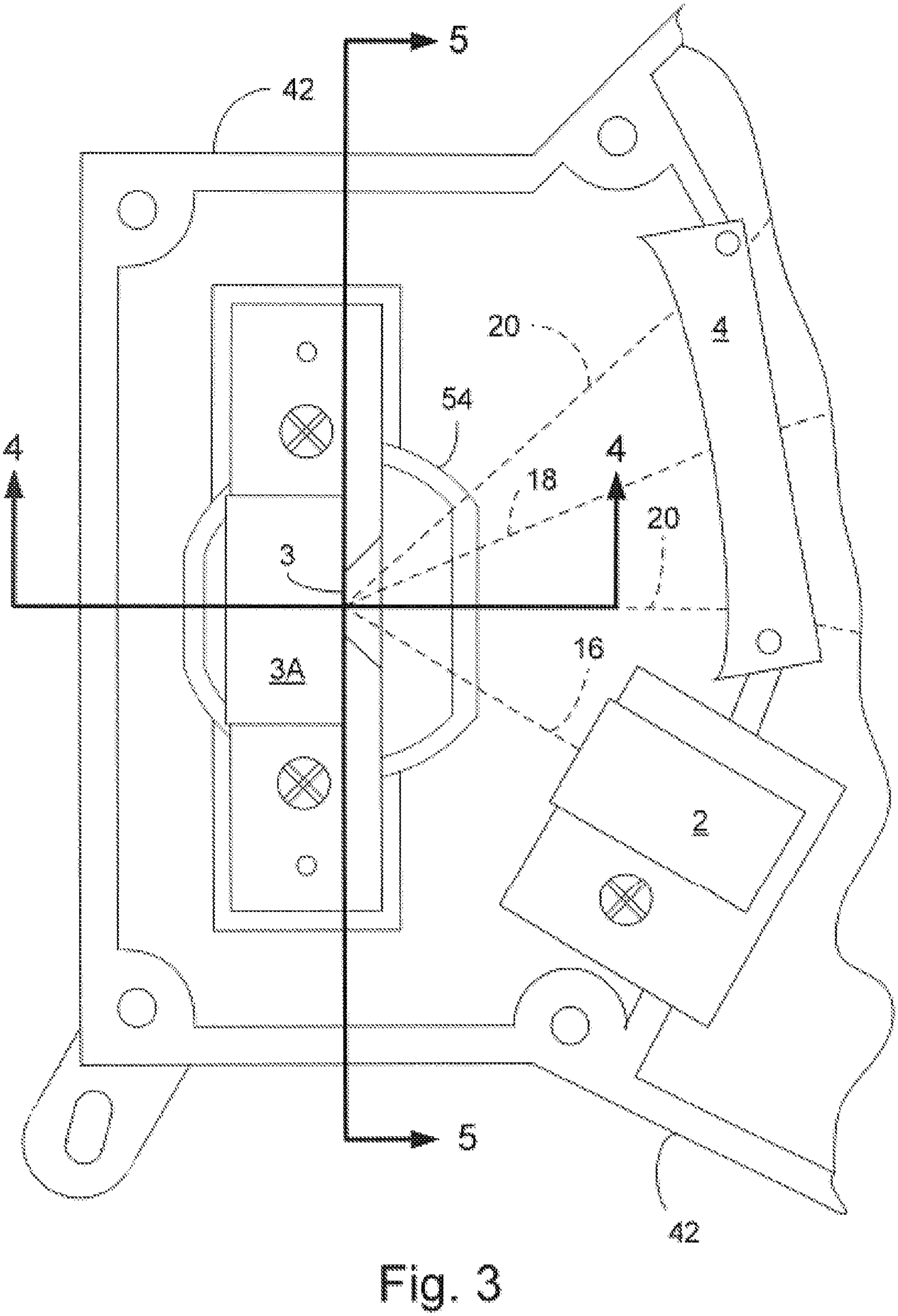
FIG. 3 is a partial top plan view of one embodiment of the scanner assembly.

FIG. 3 illustrates a partial top plan view of one embodiment of the scanner assembly 3A in the laser scanning unit 1. The scanner assembly 3A is inside the laser scanning unit 1 and is enclosed and supported by the housing 42. The illustrated embodiment shows the relationship of the laser 2 to the scanner assembly 3A and the lens 4. A laser beam 16 from the laser 2 is directed toward the scanner 3, which is contained within the scanner assembly 3A. The scanner 3 reflects the stationary laser beam 16 as a reflected laser beam 18 that sweeps between two boundaries 20.

Figure 4:
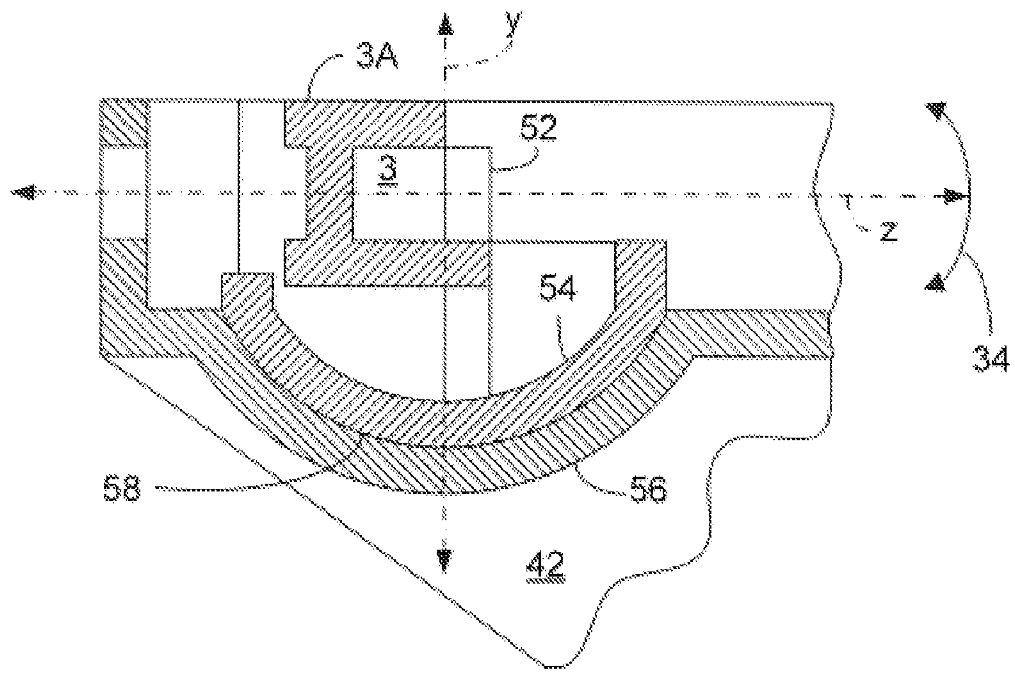
FIG. 4 is a partial cross-sectional view of one embodiment of the scanner assembly showing the y and z-axis.

FIG. 4 illustrates a partial cross-sectional view of one embodiment of the scanner assembly 3A showing the y and z-axes. The scanner assembly 3A includes the spherical base 54 that supports the scanner 3 and the scanner front-piece 52. The laser scanning unit 1 housing 42 has a socket 56 with a face 58 that forms a spherical cavity into which the spherical base 54 is received. The side view of the scanner assembly 3A illustrates that the scanner 3 is adjustable in the process direction 34 by rotating the scanner assembly 3A around the x-axis. The illustrated y-axis and z-axis intersect at both the pivot center of the scanner 3 and the center of the sphere defining the spherical base 54. Accordingly, as the spherical base 54 moves within the socket 56, the center of the scanner 3 remains at the same point.

Figure 5:
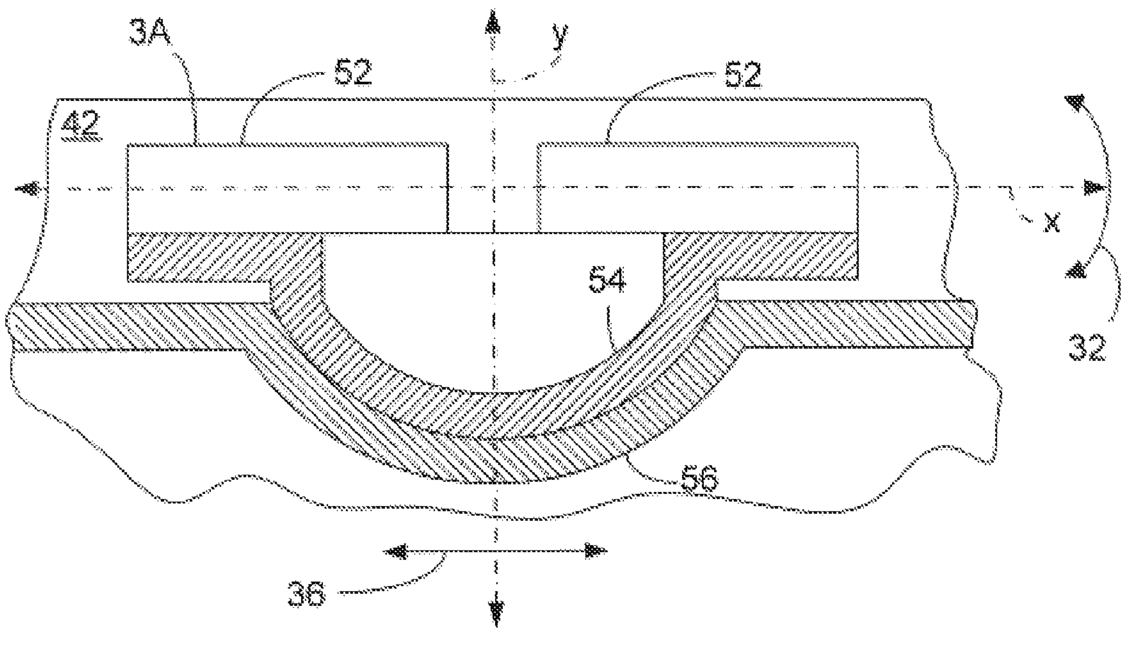
FIG. 5 is a partial cross-sectional view of one embodiment of the scanner assembly showing the x and y-axis.

FIG. 5 illustrates a partial cross-sectional view of one embodiment of the scanner assembly 3A showing the x and y-axes. The spherical base 54 is supported by the socket 56. Rotation of the scanner assembly 3A about the z-axis moves the scanner assembly 3A in the skew direction 32 while maintaining the pivotal center of the scanner 3 in the same position at the center of rotation. Also, rotating the scanner assembly 3A about the y-axis moves the scanner assembly 3A in the scan direction 36 while maintaining the pivotal center of the scanner 3 in the same position at the center of rotation.

During assembly of the laser scanning unit 1 for the embodiment illustrated in FIGS. 4 and 5, an adhesive is disposed between the spherical base 54 and the socket 56. After the scanner assembly 3A is aligned in the skew 32, process 34, and scan directions 36, the adhesive is cured. In one embodiment, the adhesive is cured by exposure to ultraviolet light.

Figure 6:
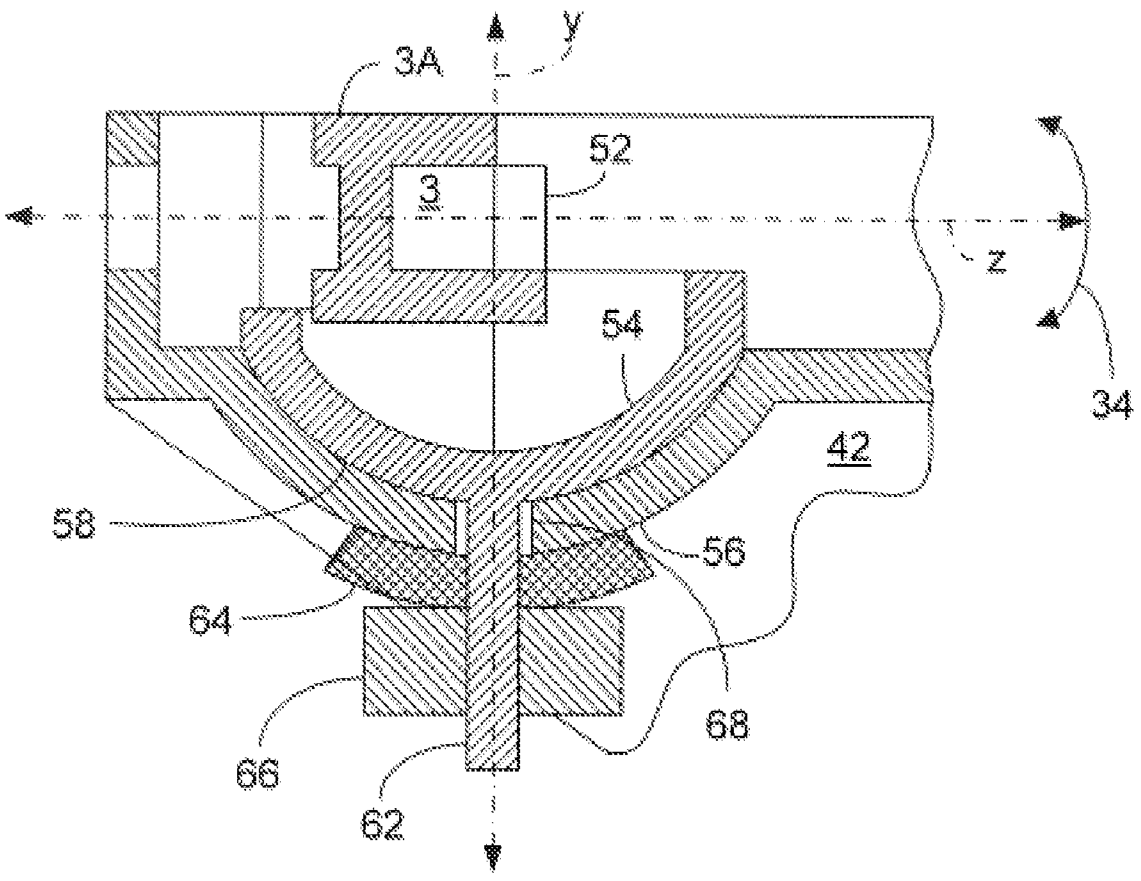
FIG. 6 is a partial cross-sectional view of a second embodiment of the scanner assembly showing the y and z-axis.

FIG. 6 illustrates a partial cross-sectional view of a second embodiment of the scanner assembly 3A showing the y and z-axes. In the illustrated embodiment, the spherical base 54 includes a threaded member 62 extending along the y-axis into an opening 68 in the socket 56. The opening 68 in the socket 56 is sufficiently large to allow the spherical base room for adjustment when the scanner assembly 3A is being aligned. Below the socket 56, the threaded member 62 engages a spherical washer 64 and a nut 66. In the illustrated embodiment, the scanner assembly 3A is aligned in the skew 32, process 34, and scan directions 36. The nut 66 is then tightened such that the spherical base 54 is held in a fixed position relative to the socket 56 and the housing 42.

In another embodiment, the spherical base 54 includes a threaded opening for receiving a threaded member such as a bolt. The bolt is inserted into the washer 64, into the opening 68 in the socket 56, and then engages the threaded opening in the spherical base 54. Tightening of the bolt secures the spherical base 54 to the socket 56.

Figure 7:
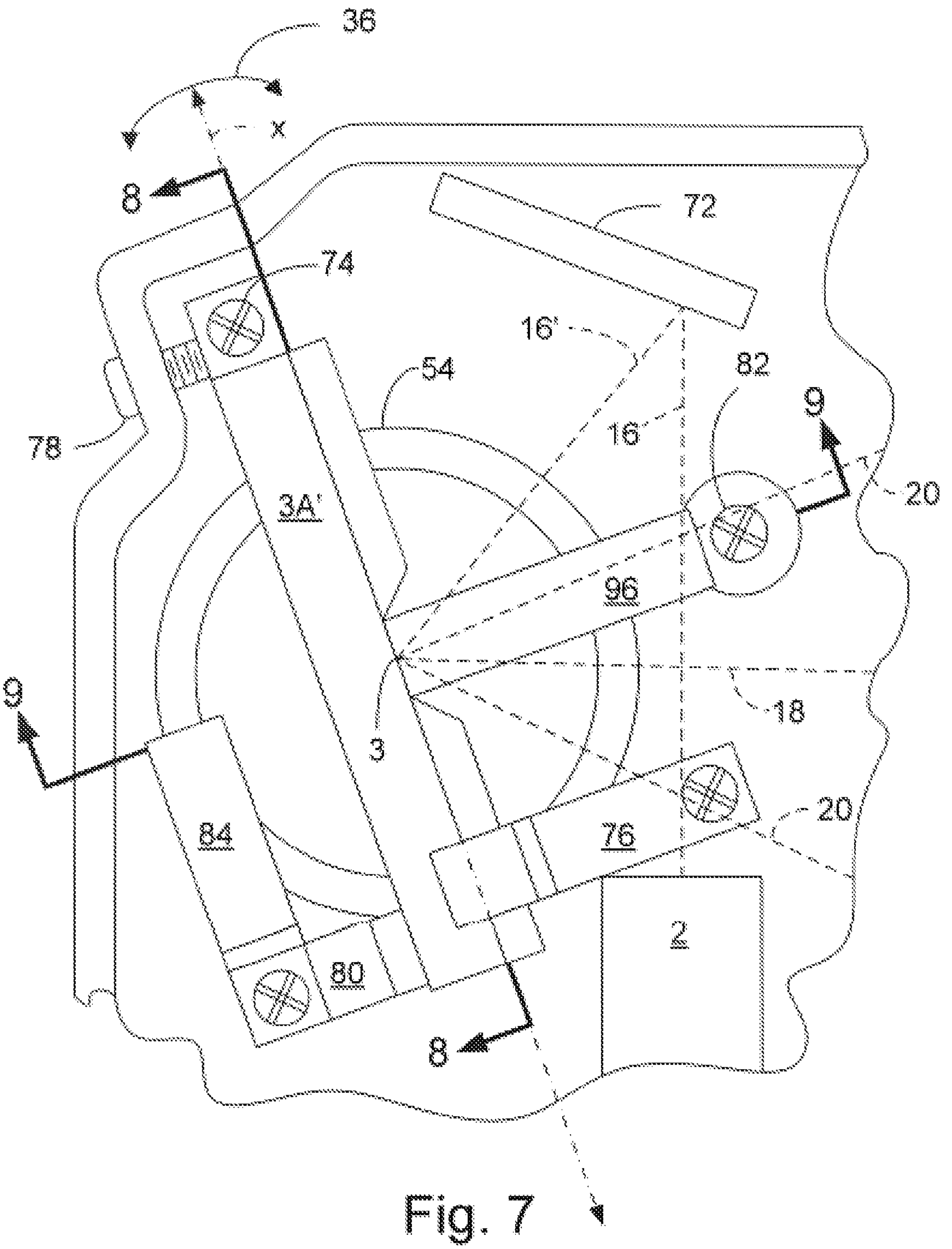
FIG. 7 is a partial top plan view of another embodiment of the scanner assembly.

FIG. 7 illustrates a partial top plan view of another embodiment of the scanner assembly 3A'. The illustrated embodiment shows the laser 2 positioned such that the stationary laser beam 16 is reflected by a mirror 72 and the reflected laser beam 16' is directed toward the scanner 3. Such a configuration allows for a compact arrangement of the laser scanning unit 1. The scanner assembly 3A' includes three adjustment screws 74, 78, 82. The adjustment screws 74, 78, 82 have a fine pitch and they are positioned away from the center of the spherical base 54, thereby allowing for precise adjustment of the scanner assembly 3A' in the skew 32, process 34, and scan directions 36. Diametrically opposite each of the adjustment screws 74, 78, 82 is a spring member 76, 80, 84 acting in concert with the adjustment screws 74, 78, 82.

In the illustrated embodiment, the x-axis is perpendicular to a plane defined by a longitudinal axis of the process adjustment screw 82 and the contact point of the corresponding spring member 84. That is, the plane defined by the longitudinal axis of the process adjustment screw 82 and the contact point of the corresponding spring member 84 to the spherical base 54 coincides with the plane defined by the z-axis and the y-axis. Accordingly, adjustment of the process adjustment screw 82 causes the scanner 3, and the scanner assembly 3A', to rotate about the x-axis in the process direction 34. A process adjustment assembly includes the process adjustment screw 82 and its corresponding spring member 84.

Likewise, the y-axis is perpendicular to a plane defined by a longitudinal axis of the scan adjustment screw 78 and the contact point of the corresponding spring member 80. That is, the plane defined by the longitudinal axis of the scan adjustment screw 78 and the contact point of the corresponding spring member 80 to the scanner assembly 3A' coincides with the plane defined by the x-axis and the z-axis. Accordingly, adjustment of the scan adjustment screw 78 causes the scanner 3, and the scanner assembly 3A', to rotate about the y-axis in the scan direction 36.

In the illustrated embodiment, the plane defined by the longitudinal axis of the skew adjustment screw 74 and the contact point of the corresponding spring member 76 is not perpendicular to the z-axis because the plane does not coincide with the plane defined by the x-axis and the y-axis. In this embodiment, the axis of rotation, which is the axis perpendicular to the plane defined by the longitudinal axis of the skew adjustment screw 74 and the contact point of the corresponding spring member 76, does not coincide with the z-axis, or the skew axis. Accordingly, the axis of rotation is not mutually orthogonal with the process axis (x-axis) and the scan axis (y-axis). Because the dihedral angle between the two planes is small, the impact of adjustments to the skew adjustment screw 74 upon the process 34 and scan directions 36 is small. However, adjustment of the skew adjustment screw 74 to vary the skew direction 32 may also potentially affect the process 34 and scan directions 36. Accordingly, to adjust the skew direction 32, all three of the adjustment screws 74, 78, 82 may require some adjustment. In another embodiment, the position of the skew adjustment screw 74 and the corresponding spring member 76 are such that their defining plane coincides with the plane defined by the x-axis and the y-axis.

One feature of the illustrated embodiment is that the three adjustment screws 74, 78, 82 are adjustable without interfering with the stationary laser beam 16, 16' or the reflected laser beam 18. With the scanner 3 stationary, that is, not oscillating, the process adjustment screw 82 is accessible for adjustment without interfering with the stationary laser beam 16, 16' or the reflected laser beam 18. The scan adjustment screw 78 and the skew adjustment screw 74 are likewise positioned such that they 78, 74 are adjustable without interfering with any laser beam 16, 16', 18. Additionally, the scan adjustment screw 78, which is normally adjusted with the scanner 3 oscillating, is located away from the scanning boundaries 20 of the sweeping reflected laser beam 18.

The scan adjustment screw 78 penetrates the housing 42 and engages one end of the scanner assembly 3A' such that adjustment of the scan adjustment screw 78 rotates the scanner assembly 3A' about the y-axis in the scan direction 36. A spring member 80 is positioned such that spring-pressure is applied to the scanner assembly 3A' substantially diametrically opposite the force applied by the scan adjustment screw 78. The spring member 80 is a rectangular sheet of spring steel that is formed so as to be fixed to the housing 42 at one end with the opposite end engaging the scanner assembly 3A'. By positioning the spring member 80 diametrically opposite the force applied by the scan adjustment screw 78, the scanner assembly 3A' is forced to rotate about an axis perpendicular to a plane defined by the diameter between the scan adjustment screw 78 and the spring member 80 and a line coinciding with the direction of force applied by the scan adjustment screw 78.

In the illustrated embodiment, the scan adjustment screw 78 engages a threaded opening in the housing 42 and the end of the adjustment screw 78 opposite the screw head pushes against the surface of the scanner assembly 3A'. The spring member 80 applies a spring force against the same surface of the scanner assembly 3A', but on the other side of the center of the spherical base 54. In another embodiment, the scan adjustment screw 78 engages a threaded opening in the scanner assembly 3A' and the spring member 80 is positioned to apply a spring force in the opposite direct at substantially the same place on the scanner assembly 3A'.

Figure 8:
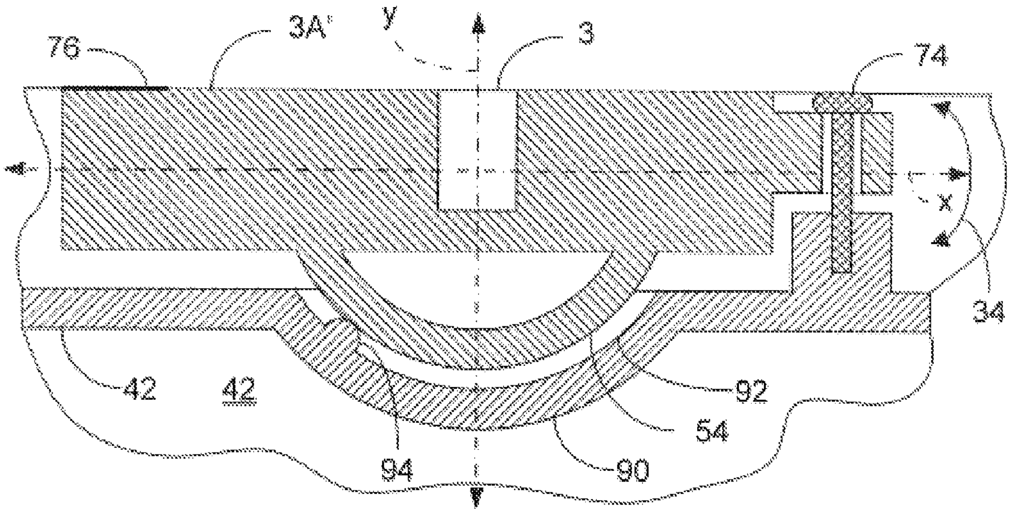
FIG. 8 is a partial cross-sectional view of one embodiment of the scanner assembly showing the x and y-axis.

FIG. 8 illustrates a partial cross-sectional view of one embodiment of the scanner assembly 3A' showing the x and y-axes. The scanner assembly 3A' includes the scanner 3 and a spherical base 54. The spherical base 54 fits into a socket, or cavity, 90 formed in the laser scanning unit 1 housing 42. Inside the cavity 90 are a plurality of protrusions 94 upon which the spherical base 54 sits. In one embodiment, three protrusions 94 are positioned at intervals within the cavity 90 and on the inside surface 92 of the cavity 90. The protrusions 90 reduce the need to precisely manufacture the cavity 90 because the protrusions 94 support the spherical base 54 much as a tripod provides support. In another embodiment, the cavity 90 does not have a spherical inside surface 92, but has some other shape. Because the protrusions 94 provide contact with and support of the spherical base 54, the precise shape and configuration of the cavity 90 can vary provided that clearance is provided for the spherical base 54 to freely move within the cavity 90.

A skew adjustment assembly includes the skew adjustment screw 74 and its corresponding spring member 76. The skew adjustment screw 74 engages a threaded opening in the housing 42. Substantially opposite the skew adjustment screw 74 is the spring member 76 that applies force to the scanner assembly 3A' to opposite the force applied by the skew adjustment screw 74. The spring member 76 is a rectangular piece of flat spring steel that is configured to attach to the housing 42 at one end with the opposite end applying a spring force to the scanner assembly 3A'. As described above, adjustment of the skew adjustment screw 74 causes the scanner assembly 3A' to rotate substantially around z-axis in the skew direction 32.

Figure 9:
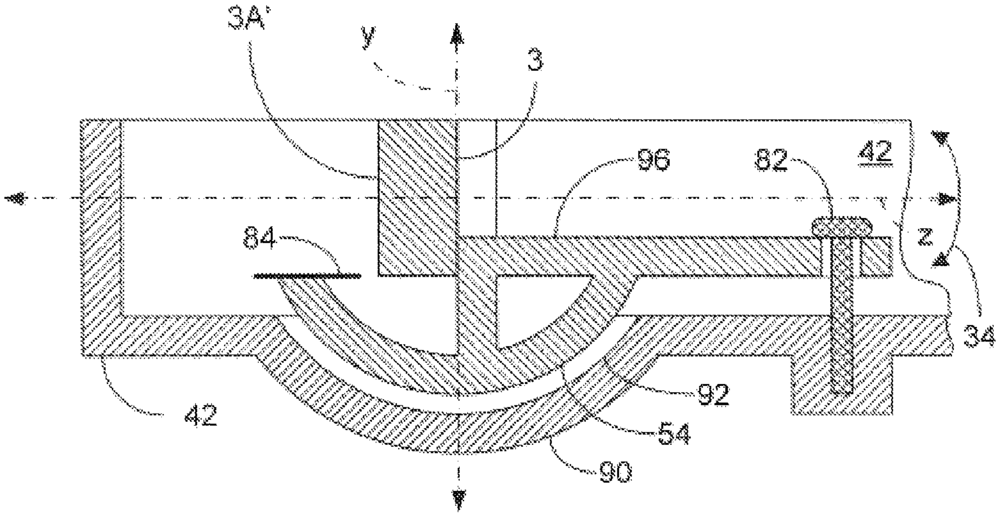
FIG. 9 is a partial cross-sectional view of one embodiment of the scanner assembly showing the y and z-axis.

FIG. 9 illustrates a partial cross-sectional view of one embodiment of the scanner assembly 3A' showing the y and z-axes. The scanner assembly 3A' includes a cantilevered arm 96 that receives a process adjustment screw 82 that engages a threaded opening in the housing 42. On the opposite side of the spherical base 54 from the cantilevered arm 96 is the spring member 84 portion that engages the spherical base 54 to apply a spring force to counteract the force applied by the process adjustment screw 82.

The protrusions 94 are bearing supports for the spherical base 54. Because the three protrusions 94 are positioned at regular intervals in the cavity 90 and the cross-sections of FIGS. 8 and 9 are positioned 90 degrees apart, none of the protrusions 94 are visible in FIG. 9. In one embodiment, the three protrusions 94 have an angular separation of 120 degrees, forming a tripod upon which the spherical base 54 is uniformly supported. In one embodiment, the protrusions 94 are used with the socket 56 illustrated in the embodiment of FIG. 6.

A method of aligning the scanner assembly 3A' illustrated in FIG. 7 is to activate the laser 2 such that the stationary laser beam 16' strikes the pivotal center of the scanner 3. With the scanner 3 stationary, that is, not oscillating, the process adjustment screw 82 and the scan adjustment screw 78 are adjusted until the reflected laser beam 18 strikes the center of the first lens 4 or some other predetermined point in the laser scanning unit 1. The skew adjustment screw 74 is adjusted with the scanner 3 scanning until the reflected laser beam 18 follows a predetermined scan path 22. The adjustment of the three adjustment screws 74, 78, 82 is repeated until the desired accuracy of the reflected laser beam 18 placement in the skew 32, process 34, and scan directions 36 is achieved. In one embodiment, a paint or other fixing agent is applied to the heads of the adjustment screws 74, 78, 82 to fix the alignment and prevent changes in the alignment due to vibration and other factors.

The components of the laser scanning unit 1 perform various functions. The function of securing the spherical base 54 to the socket 56 is implemented, in one embodiment, by an adhesive disposed between the outside surface of the spherical base 54 and the inside surface of the socket 56, and then curing the adhesive. In another embodiment, the function of securing is performed by a threaded member 62 extending from the spherical base 54 through an opening in the socket 56. A washer 64 and a nut 66 engages the threaded member 62, thereby clamping the socket 56 between the nut 66 and the base 54. In another such embodiment, the function of securing is performed by a threaded member, such as a bolt, passing through the opening in the socket 56 and engaging a threaded opening in the spherical base 54. In still another embodiment, the function of securing is performed by a plurality of adjustment screws 74, 78, 82 and corresponding spring members 76, 80, 84 securing the spherical base 54 within a socket, or cavity, 90.

The function of adjusting a position of the scanner assembly 3A, 3$a$' relative to the socket 56, 90 along a plurality of orthogonal axes (x, y, z-axes) is implemented, in one embodiment, by the spherical base 54 sliding within the socket 56 as illustrated in FIGS. 3 to 6. In another embodiment, the function of adjusting is performed by the plurality of adjustment screws 74, 78, 82 and corresponding spring members 76, 80, 84 as illustrated in FIGS. 7 to 9.

The function of supporting the spherical base 54 within the cavity 90 is implemented, in one embodiment, by the plurality of protrusions 94 extending from the inside of the cavity 90. The protrusions 94 have a surface acting as a bearing upon which the spherical base 54 is supported and slides as the scanner assembly 3A, 3A' is adjusted and aligned.

The foregoing description of preferred embodiments has been presented for purposes of illustration and description. They are not intended to be exhaustive or to limit the invention is the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An apparatus for positioning and aligning a laser beam within a laser scanning unit for an image forming device, said apparatus comprising:

a scanner assembly including a scanner and a base, said scanner being an oscillating scanner having a pivoting center located on a reflecting surface of the scanner for reflecting a laser beam such that said reflecting surface reflects the laser beam, said base formed of a spherical portion, said spherical portion defining a sphere having a center coinciding with said pivoting center of said scanner such that said pivoting center of said oscillating scanner is positioned at a center of the sphere defined by said spherical portion; and a socket for receiving said spherical portion of said base, said socket maintaining said pivoting center at a single spatial point independent of a position of said base when received by said socket.

2. The apparatus of claim 1 wherein said socket has an inside surface that is spherical and sized to mate with said sphere of said base.

3. The apparatus of claim 1 wherein said socket has an inside surface that is spherical and sized to mate with said sphere of said base, said base secured to said socket with an adhesive.

4. The apparatus of claim 1 wherein said base includes a threaded member and said socket includes an opening for receiving said threaded member, and further including a nut for engaging said threaded member whereby said base is secured to said socket by sandwiching said socket between said nut and said base.

5. The apparatus of claim 1 wherein said base includes a threaded opening and said socket includes an opening, and the apparatus further including a threaded member for being received in said socket opening and engaging said threaded opening in said base whereby said base is secured to said socket by sandwiching said socket between said base and a head of said threaded member.

6. The apparatus of claim 1 further including a means for securing said base to said socket.

7. The apparatus of claim 1 wherein said scanner assembly further includes:

a first adjustment assembly having a threaded member located substantially diametrically opposite a spring member, operation of said threaded member being opposed by a spring force from said spring member, operation of said threaded member causing said scanner assembly to rotate about a first axis relative to said socket;

a second adjustment assembly having a threaded member located substantially diametrically opposite a spring member, operation of said threaded member being opposed by a spring force from said spring member, operation of said threaded member causing said scanner assembly to rotate about a second axis relative to said socket; and a third adjustment assembly having a threaded member located substantially diametrically opposite a spring member, operation of said threaded member being opposed by a spring force from said spring member, operation of said threaded member causing said scanner assembly to rotate about a third axis relative to said socket, said first, second, and third axes being substantially mutually orthogonal.

8. The apparatus of claim 7 wherein each said threaded member for said first second, and third adjustment assemblies is positioned such that adjustment of each said threaded member does not interfere with the laser beam.

9. The apparatus of claim 1 further including means for adjusting a position of said scanner assembly relative to said socket along a plurality of orthogonal axes.

10. The apparatus of claim 1 wherein said socket further includes a plurality of protrusions in contact with a surface of said base, said protrusions providing a bearing surface for supporting said base.

11. The apparatus of claim 1 wherein said socket further includes a means for supporting said base.

12. An apparatus for positioning and aligning a laser beam within a laser scanning unit for an image forming device, said apparatus comprising:

a scanner assembly including a scanner and a base, said scanner being an oscillating scanner having a pivoting center located on a reflecting surface of the scanner for reflecting a laser beam such that said reflecting surface reflects the laser beam, said base formed of a spherical portion;

a socket for receiving said spherical portion of said base; and a plurality of adjustment assemblies for adjusting an angular position of said base within said socket, whereby said pivoting center is positioned at a center of a sphere defined by said spherical portion such that said pivoting center of said scanner remains in a fixed spatial position relative to the laser scanning unit when said plurality of adjustment assemblies are operated.

13. The apparatus of claim 12 wherein said spherical portion of said base has a center coinciding with said pivoting center of said scanner.

14. The apparatus of claim 12 wherein said plurality of adjustment assemblies includes a first adjustment assembly having a threaded member located substantially diametrically opposite a spring member, operation of said threaded member being opposed by a spring force from said spring member, operation of said threaded member causing said scanner assembly to rotate about a first axis relative to said socket.

15. The apparatus of claim 14 wherein said plurality of adjustment assemblies includes a second adjustment assembly having a threaded member located substantially diametrically opposite a spring member, operation of said threaded member causing said scanner assembly to rotate about a second axis relative to said socket, said second axis being substantially orthogonal to said first axis.

16. The apparatus of claim 15 wherein said plurality of adjustment assemblies includes a third adjustment assembly having a threaded member located substantially diametrically opposite a spring member, operation of said threaded member being opposed by a spring force from said spring member, operation of said threaded member causing said scanner assembly to rotate about a third axis relative to said socket, said third axis being substantially orthogonal to said first and second axes.

17. The apparatus of claim 12 wherein said socket further includes a plurality of protrusions in contact with a surface of said base, said protrusions providing a bearing surface for supporting said base.

18. The apparatus of claim 12 wherein said socket further includes a means for supporting said base.

19. An apparatus for positioning and aligning a laser beam within a laser scanning unit for an image forming device, said apparatus comprising:

a scanner;

a base formed of a spherical surface portion, said base supporting the scanner, said scanner being an oscillating scanner with a pivoting center positioned at the center of a sphere defined by the spherical surface portion, said pivoting center located on a reflecting surface of said scanner for reflecting a laser beam;

a socket in a fixed relation to the laser scanning unit, said socket for receiving said spherical surface portion of said base; and a means for adjusting a position of said base relative to said socket while said pivoting center remains in a substantially fixed position.

20. The apparatus of claim 19 further including a means for securing said base to said socket.

21. The apparatus of claim 19 wherein said socket further includes a means for supporting said base.

* * * * *